United States Patent [19]

Tamura et al.

[11] 4,320,554
[45] Mar. 23, 1982

[54] OUTSIDE MIRROR WITH WIPER

[75] Inventors: Takeo Tamura, Yokohama; Tatuo Nakamura, Tokyo, both of Japan

[73] Assignees: Nissan Motor Co., Ltd.; Ichiko Industries Limited, both of Japan

[21] Appl. No.: 171,678

[22] Filed: Jul. 24, 1980

[30] Foreign Application Priority Data

Jul. 31, 1979 [JP] Japan .................................. 54/96740

[51] Int. Cl.³ .............................................. B60S 1/08
[52] U.S. Cl. .................................. 15/250 B; 350/289
[58] Field of Search ............. 15/250 B, 250.3, 250.31; 350/61, 289; 74/501 M

[56] References Cited

U.S. PATENT DOCUMENTS 2,944,277  7/1960  Ochello et al. ..................... 15/250 B
3,075,431  1/1963  White ................................... 350/289
3,609,014  9/1971  Kurz, Jr. ............................. 350/289

FOREIGN PATENT DOCUMENTS 229252    6/1960  Australia .......................... 15/250 B
1275395   7/1968  Fed. Rep. of Germany .... 15/250 B Primary Examiner—Peter Feldman
Attorney, Agent, or Firm—Thompson, Birch, Gauthier & Samuels

[57] ABSTRACT

An outside mirror with a wiper is disclosed. The outside mirror includes a mirror drive motor and a wiper drive motor for a wiper. The wiper drive motor is mounted for rotation about an axis perpendicular to the mirror drive motor. The wiper is spring biased against the mirror to follow the movement thereof. As the mirror pivots about a vertical axis, a wiper guide urges the drive motor to pivot correspondingly so that the wiper follows the mirror surface. As the mirror pivots about a horizontal axis, the spring biased wiper follows the mirror to maintain the proper wiping contact with the mirror.

4 Claims, 7 Drawing Figures

OUTSIDE MIRROR WITH WIPER

BACKGROUND OF THE INVENTION

The present invention relates to an outside mirror with a wiper that follows the movement of the surface of a remote-controlled mirror.

SUMMARY OF THE INVENTION

According to the present invention, an outside mirror with a wiper includes a wiper drive motor mounted for rotation about an axis perpendicular to that of a mirror drive motor. The wiper is spring biased against the mirror surface to follow the movement thereof. As the mirror moves, the wiper drive motor pivots about a vertical axis passing through the pivot point of the mirror.

An object of the present invention is to provide an outside remote-controlled mirror having a wiper that follows the pivotal movement of the mirror.

BRIEF DESCRIPTION OF THE DRAWINGS

In the accompanying drawings.

DETAILED DESCRIPTION OF THE INVENTION

Figure 1:
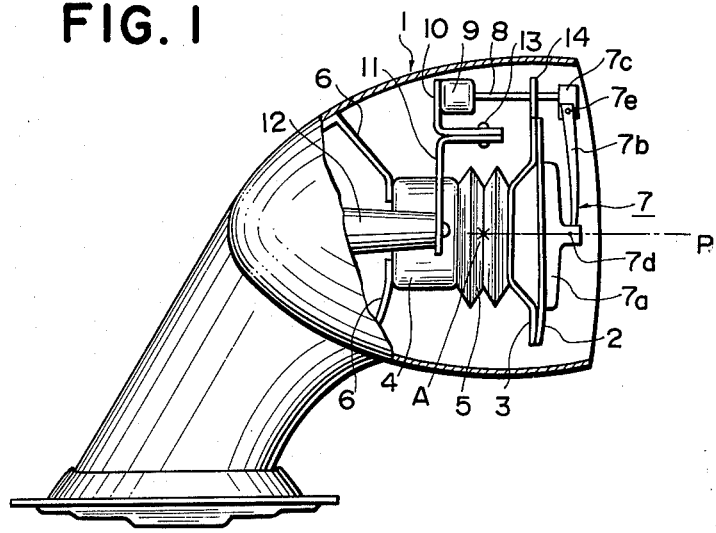
FIG. 1 is a side view partly broken away illustrating a preferred embodiment of an outside mirror according to the present invention.
Figure 2:
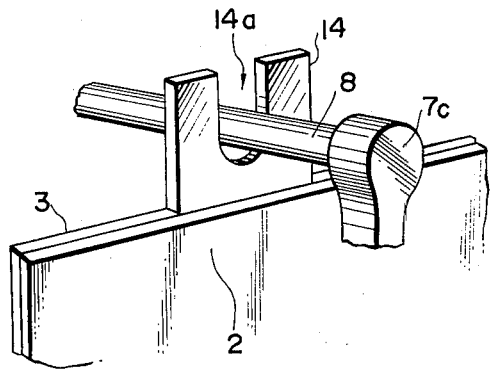
FIG. 2 is an enlarged perspective view of the wiper guide used in FIG. 1.
Figure 3:
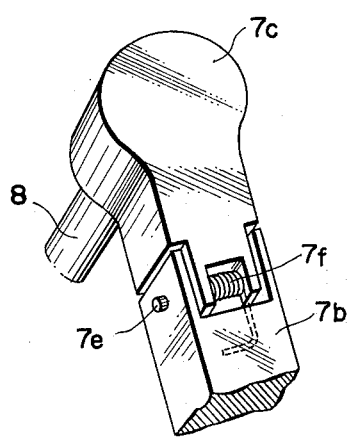
FIG. 3 is an enlarged perspective view of the wiper base.

Referring to FIG. 1, a preferred embodiment of an outside mirror according to the present invention is shown wherein 1 designates a mirror housing, 2 a mirror, 3 a mirror support member, 4 a mirror drive motor, 5 a bellows and A designates the center of pivotal movement of the mirror. An attachment arm 6 attaches the remote-controlled mirror 2 to the mirror housing 1. A wiper 7 comprises a wiper base 7c, a wiper arm 7b pin connected to the wiper base 7c with a pin 7e, and a wiper blade 7a. As shown in FIG. 3, a spring 7f is arranged to bias the wiper blade 7a against the mirror 2.

A drive motor 9 is attached to a bracket 10 which is pivotally attached to a support bracket 11 at pivot point 13 to pivot about a vertical axis passing through the pivot point A of the mirror. This support bracket 11 is mounted to a support arm 12 fixedly connected to the mirror housing 1.

A wiper drive shaft 8 is fixed to the wiper base 7c and passes through a cutout 14a in a wiper guide 14 provided at the upper center of the mirror support member 3. The cutout 14a is deep enough to prevent interference between the wiper guide 14 and the wiper drive shaft 8 as the mirror 2 pivots about a horizontal axis at A. The width of the cutout 14a is such as to direct the wiper drive shaft 8 to follow the movement of the mirror 2 to the left or right.

Figure 4A:
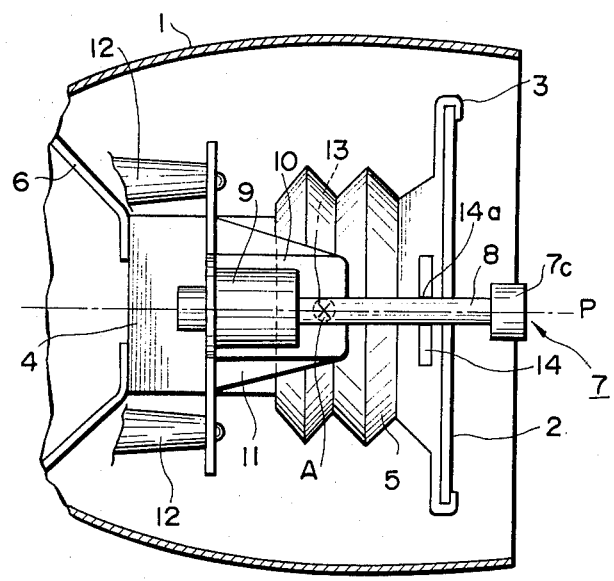
FIGS. 4A and 4B are top views partly broken away to illustrate the pivotal movement of the mirror and wiper assembly about a vertical axis.
Figure 4B:
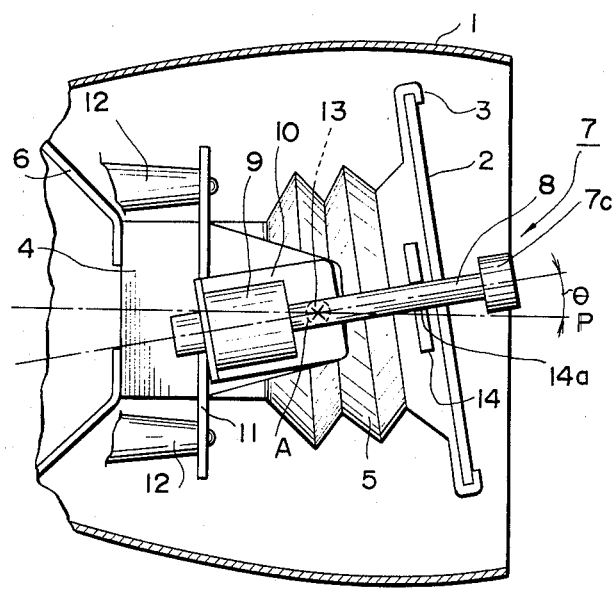

In operation, when the mirror 2 pivots to the left or right about a vertical axis passing through A (see FIGS. 4A and 4B), the wiper guide 14 urges the wiper drive shaft 8 to follow so that the bracket 10 pivots about point 13. This causes the wiper 7 to follow the pivotal movement of the mirror 2 about point A. Those skilled in the art will appreciate that the present construction demands that the axis of the wiper drive shaft 8 and the axis passing through the mirror pivot point A normal to the mirror surface are always in the same plane.

Figure 5A:
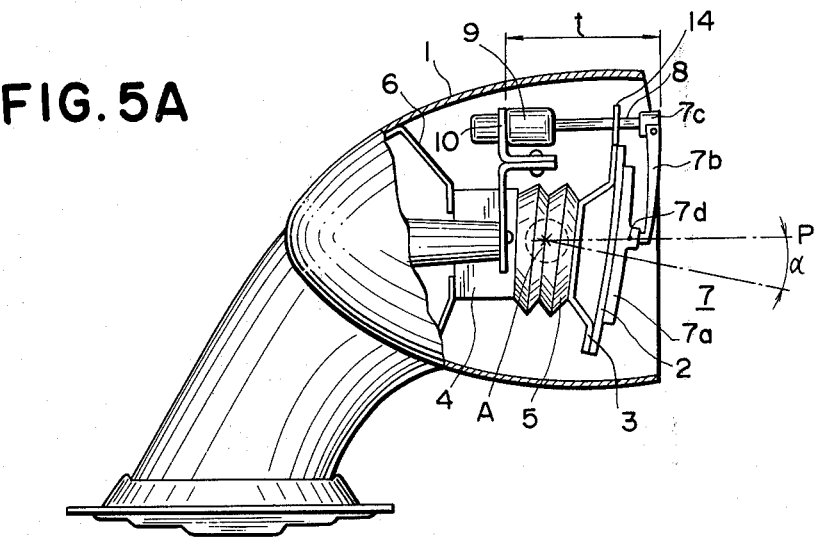
FIGS. 5A and 5B are views similar to FIG. 1 illustrating the pivotal movement of the mirror and wiper assembly about a horizontal axis.
Figure 5B:
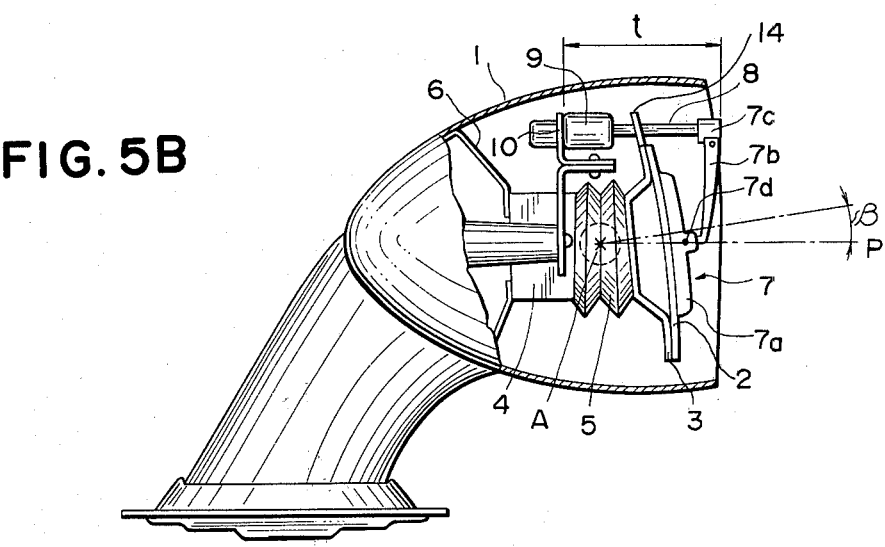

Referring to FIGS. 5A and B, if the mirror 2 is pivoted about a horizontal axis through A, the wiper blade 7a slides vertically along the mirror surface a distance corresponding to the length of an arc on the mirror surface through the angle of pivot. The wiper blade 7a pivots about point 7d, which always remains along line P, as shown. Here, it is to be noted that the distance t from the bracket 10 to the wiper base 7c does not change. The change in distance from point A to point 7d is only minimal, and is compensated for by the spring 7f constantly urging the wiper arm 7b toward the mirror.

Obviously, the mirror 2 may be pivoted about point A in any direction with the result that a combination of effects explained hereinabove relating to vertical and horizontal pivotal movement results in the wiper mechanism 7 following the mirror at any pivot angle to maintain the proper wiping angle between the blade and mirror surface.

What is claimed is:
1. An outside mirror with wiper comprising:
   (a) a mirror housing adapted for mounting on a vehicle;
   (b) a mirror affixed to and supported by a mirror support member;
   (c) vehicle operator-actuated remote control means mounted to said mirror housing and operably connected to said mirror support member for enabling the vehicle operator to pivotally adjust the position of said mirror about a mirror pivot point;
   (d) a wiper having a wiper blade fitted to one end of a wiper arm in position to sweep across the surface of said mirror, and a wiper drive motor having a drive shaft fitted to the other end of said wiper arm for reciprocally pivoting said wiper arm about said other end of said wiper arm in the manner of a winshield wiper;
   (e) wiper pivotal support means affixed within said mirror housing, said wiper drive motor being mounted on said wiper pivotal support means so that said wiper drive shaft rotatably swings about a substantially vertical axis extending through said mirror pivot point;
   (f) said mirror support member having guide means acting on said wiper drive shaft for urging said wiper drive shaft to pivot in a substantially horizontal plane in substantial angular correspondence with the pivoting action of said mirror; and
   (g) biasing means on said wiper for constantly urging said wiper blade to press against and follow the surface of said mirror.

2. The apparatus of claim 1 wherein said guide means has laterally spaced-apart guide surfaces which bear against the sides of said wiper drive shaft.

3. The apparatus of claim 1 wherein said biasing means includes a spring arranged to urge said wiper arm towards said mirror.

4. The apparatus of claim 3 wherein said wiper includes a wiper base affixed to the end of said wiper drive shaft, said wiper base having a short extension extending substantially normal to the axis of said wiper drive shaft, said wiper arm pivotally attached to and in substantial alignment with said wiper base short extension, and said spring being mounted between and acting upon said short extension and said wiper arm at the pivotal attachment location.

* * * * *